Jan. 8, 1963 P. FORTESCUE ETAL 3,072,552
FUEL ELEMENT INTERLOCKING ARRANGEMENT
Filed May 14, 1959 2 Sheets-Sheet 1
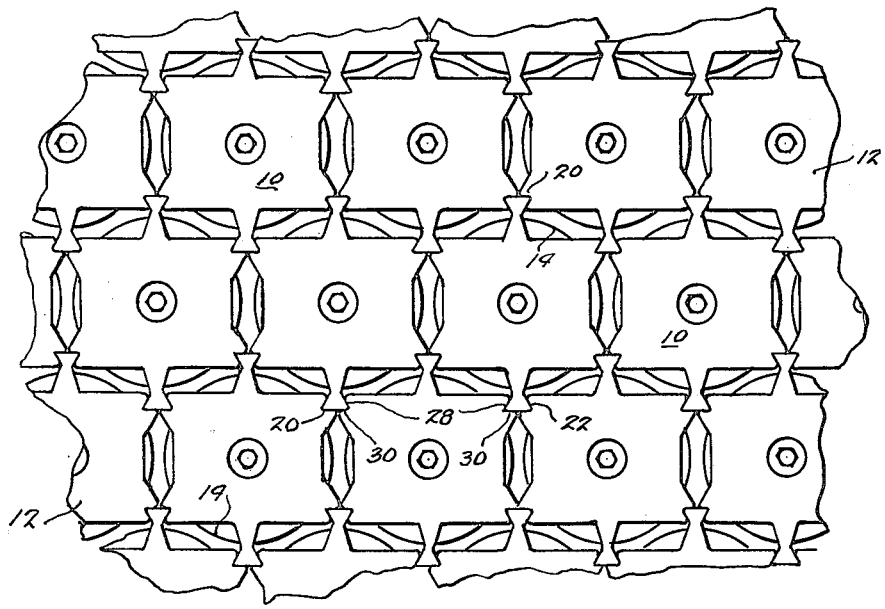
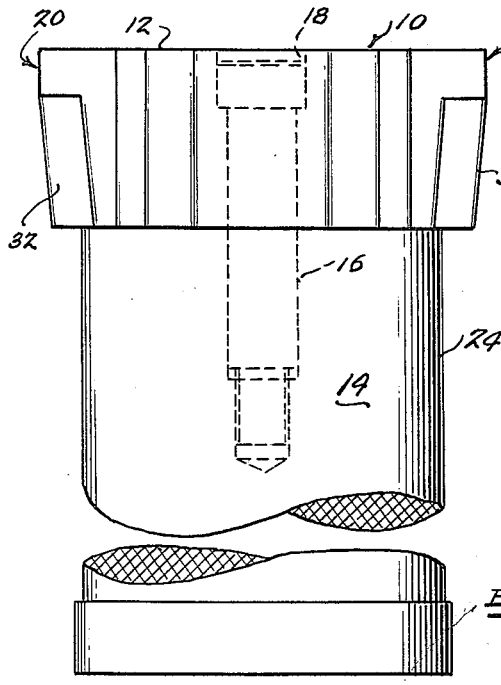
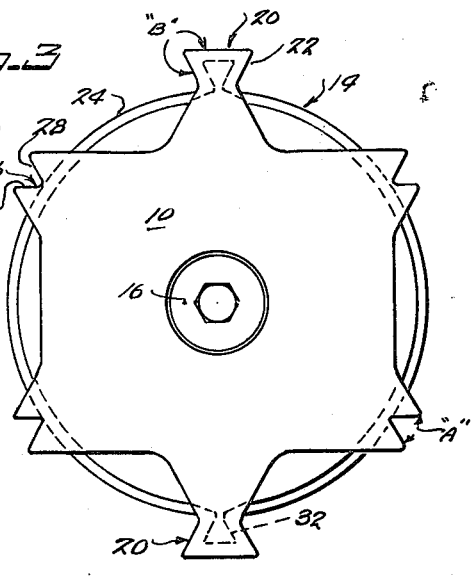
Inventor
PETER FORTESQUE
DAVID NICOLL
By Soans, Anderson, Luedeka & Fitch
Att'ys Jan. 8, 1963  P. FORTESCUE ETAL  3,072,552
FUEL ELEMENT INTERLOCKING ARRANGEMENT
Filed May 14, 1959  2 Sheets-Sheet 2
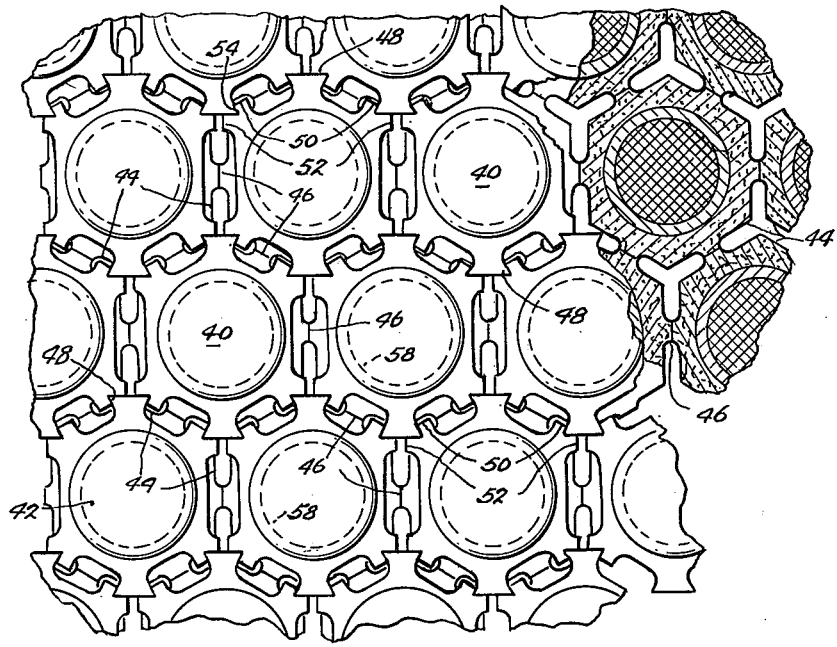
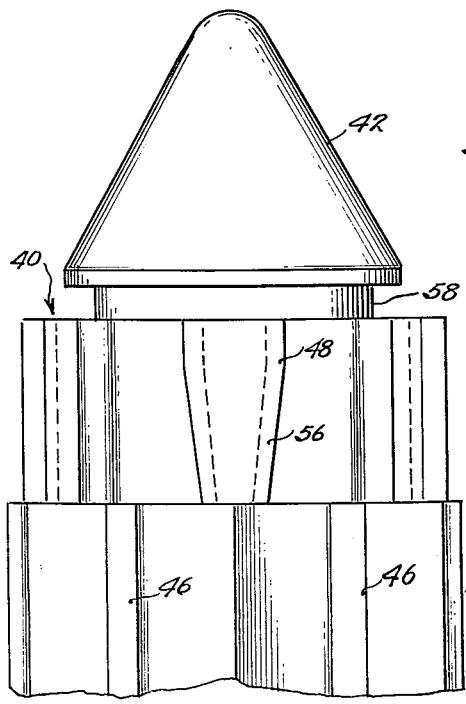
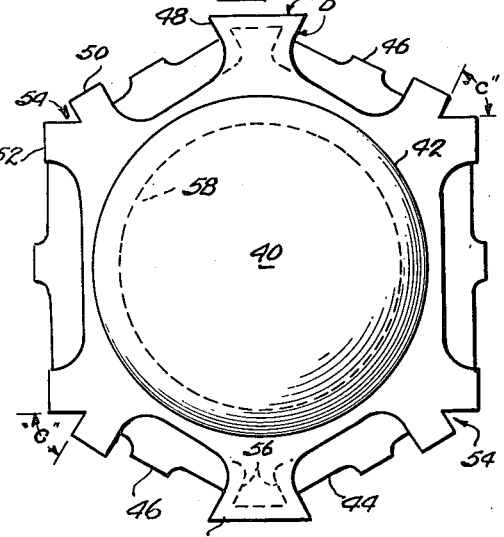
Inventor
PETER FORTESCUE
DAVID NICOLL

3,072,552
FUEL ELEMENT INTERLOCKING ARRANGEMENT

Peter Fortescue and David Nicoll, La Jolla, Calif., assignors, by mesne assignments, to the United States of America as represented by the United States Atomic Energy Commission
Filed May 14, 1959, Ser. No. 813,171
5 Claims. (Cl. 204—193.2)

The present invention relates generally to nuclear reactors and is particularly directed to a fuel element arrangement for a nuclear reactor.

A variety of arrangements for the placement of fuel elements and control rods within the core of nuclear reactors have been devised throughout the course of neutronic reactor development. In many instances a cell-like supporting structure, which has spaced-apart passages for receiving the fuel elements and control rods in parallel, spaced relation to one another, is provided in the reactor. This cellular structure in the reactor core has been formed in many different ways, including structures which extend the entire length of the fuel elements, as well as spaced-apart support means disposed adjacent the top and bottom of the reactor core, respectively, which are provided with aligned openings to receive the fuel elements and provide support therefor adjacent opposite ends of the elements.

These known forms of fuel element supporting structures have generally afforded the desired arrangement of the elements, but they have not been entirely satisfactory, particularly with regard to placement and withdrawal of the elements relative to the core. Generally, it has been necessary to handle fuel elements and control rods one at a time in withdrawing spent elements or replacing fresh elements. This is necessary either because the supporting structure for the elements interferes with any attempt to handle more than one element at a time, or because the elements are dependent on the adjoining elements for lateral support and the withdrawal of more than one element at a time would result in a toppling of the surrounding elements.

It is the principal object of the present invention to provide means which overcomes the aforementioned deficiencies and which affords the handling of one or a plurality of fuel elements and/or control rods without endangering the positioning of the remaining elements in the reactor core. A further object is to provide fuel elements and control rods which are adapted for releasable interlocking engagement with one another so as to position the elements and rods in parallel relation, with each element providing lateral support for the adjoining elements. Still another object of the invention is to provide means adjacent the upper portion of a fuel element, which is fixed on the element and which includes male and female peripheral portions adapted for the interengagement with complementary peripheral portions of like means on adjoining fuel elements. Other objects and advantages will become apparent from the following description of selected embodiments of the invention.

In the drawings:

FIGURE 1 is a fragmentary plan view of an arrangement of fuel elements in accordance with the present invention;

FIGURE 2 is a side elevation view of the single fuel element in accordance with the present invention;

FIGURE 3 is a plan view of the element shown in FIGURE 2;

FIGURE 4 is a fragmentary plan view of a fuel element arrangement within a nuclear reactor core, wherein a modified form of fuel element interlocking means is employed;

FIGURE 5 is an enlarged, side elevational view of the upper end portion of one of the elements shown in FIGURE 4; and FIGURE 6 is a plan view of the element in FIGURE 5.

Generally, the present invention contemplates the provision of an interlocking means for fuel elements and control rods within a reactor vessel, wherein such interlocking means comprises a collar or cap adjacent the upper end of each fuel element, which interlock cap is non-circular and non-rectangular in form and which is provided with one or more laterally extending projections and one or more recess-forming peripheral portions. The recess-forming portions are complementary in shape to the projections so as to afford interlocking engagement with adjoining fuel elements provided with a similar cap or collar, when the elements are arranged in parallel arrangement, as in a reactor core.

With reference first to FIGURES 1 to 3 of the drawings, it is seen that an interlocking means 10 chosen to illustrate this invention comprises a cap 12 which is adapted to be secured to the upper end of a fuel element 14, as by a screw 16 having its head countersunk in a recess 18 in the cap. The cap 12 is of a configuration such that it provides a pair of oppositely extending projections 20 having enlarged outer portions 22 extending beyond the outer diameter of the fuel element casing 24. It will be noted that each of these outer portions are generally wedge-shaped or dove-tailed, in order to provide interlocking with similar caps on adjoining fuel elements, as seenn in FIGURE 1.

The main body of the interlock cap 12 is generally square and at each corner thereof it is shaped to provide a groove 26, which is formed of two side wall portions 28 and 30 arranged to form an acute angle "A" which is complementary to the angle "B" formed at each outside corner of the dove-tail projection 20. These angular grooves 26 also extend, at least slightly, beyond the outer casing 24 of the fuel element. As noted in FIGURE 1, the elements are arranged in the reactor core so that each adjoining pair of elements have the interlock caps 10 disposed so that an angular groove 26 in one cap faces an angular groove 26 in the adjacent cap so that these facing grooves jointly provide a complementary wedge-shaped or dove-tailed recess or female portion to receive one of the dove-tail projections or male portions 20 on an adjoining element.

It is preferable that the dove-tail portions 20 of the interlock be tapered inwardly, at least along the lower portion of the cap 12, as seen particularly at 32 in FIGURE 2, in order to facilitate insertion of the dove-tail into its receiving groove formed by two adjacent interlock means, whereby the dove-tail 20 becomes interlocked with two adjoining fuel elements. Moreover, it is believed desirable, in any event, to provide sufficient tolerance between the dove-tails 20 and the grooves 26 to avoid any possible binding therebetween and to make it relatively easy to move one or more fuel elements lengthwise relative to surrounding elements within the core.

It will be seen, therefore, that fuel elements provided with the interlock caps afford a regular patterned arrangement of the elements within the core. It will be understood, of course, that the elements are suitably supported and positioned at their base, for example, as by the positioning of the base of each element in a recess formed in the base reflector of the reactor core. The interlock caps not only provide proper positioning of the upper ends of the elements, but also afford proper spacing of the elements for passage of the heat exchange fluid, whether water or gas, used in the reactor.

Of particular importance and advantage, however, is the feature of interlocking the fuel elements and control rods so that withdrawal of one or a plurality of elements and/or rods does not affect the stability or positioning of the remainder of the rods. Consequently, a number of elements may be withdrawn from the core, singly or all at once, without requiring the immediate placement of fresh elements within the core to provide lateral support for the other elements in the core. This opens the way to new procedures in the handling of fuel elements and makes it possible to utilize equipment, such as grapplers, which might raise a plurality of fuel elements and control rods from the core in a single operation. Moreover, it will also be apparent that the elements around the periphery of the reactor core can be fixedly positioned relative to the side reflector material by providing complementary grooves and/or dove-tails in the side reflector for interlocking engagement with the interlock means on the elements.

Although the interlock means in FIGURES 1 to 3 is shown as a detachable cap, it will be apparent that a similar means might be in the form of a collar fixed around the fuel element at an intermediate position therealong. In either event, a suitable grappler head can be provided on the element at the upper end thereof for engagement by grappling means entering the reactor vessel. Also, the interlock itself, when placed at the upper end of the element, may include suitable side projections or recesses for engagement by a grappler.

Another form of interlock is illustrated in FIGURES 4 to 6, wherein the interlock means 40 also includes or is disposed immediately below a grappler head 42, and the interlock is used in connection with a fuel element having a casing 44 that is polygonal in cross-section. More particularly, the fuel element casing 44 is hexagonal in shape with each of the six sides including a longitudinally extending rib portion 46. These rib portions 46 are intended to engage, or be closely positioned with respect to, similar ribs on adjoining fuel elements, to thereby provide lateral support against possible buckling of the individual elements under the high heat of neutronic reaction within the core. It may be desirable in some instances to simply provide comparable projecting portions at the top, center, and bottom portions of each element, rather than extend a rib the full length of the element as illustrated in the drawings.

As seen particularly in FIGURES 5 and 6, the interlock 40 is generally hexagonal in its configuration and is provided with a pair of oppositely projecting dove-tail portions 48 generally similar to those described above and which are disposed generally at opposite apices of the hexagon. The four remaining apices of the generally hexagonal interlock are each provided with projecting portions 50 and 52 defining a groove 54 therebetween forming an angle "C" which is complementary to the oblique angle "D" formed by the dove-tail 48. It will be apparent, therefore, that the fuel elements bearing the interlock means 40 are positionable in generally the same manner as described with respect to the embodiment of FIGURES 1 to 3, with each of the dove-tails 48 fitted within the key-way provided by facing grooves 54 on an adjoining pair of the fuel elements. As noted in FIGURE 4, however, with the polygonal-shaped fuel elements and the lateral support provided by the ribs or projections 46 on the sides thereof, the interlock means 40 need not be entirely depended upon for lateral support of the elements and, therefore, the tolerances between the interlocking dove-tails 48 and grooves 54 can be such as to provide greater clearances and thereby make it easier to move one or more elements out of interlocking engagement with the surrounding elements. As in the previous embodiment, the dove-tail projections 48 are preferably tapered, as indicated at 56 in FIGURE 5, to a reduced size adjacent their lower end to facilitate insertion of the dove-tail into the receiving grooves provided in the adjoining elements.

The grappler head 42 is provided at the top of the fuel element and above the interlock main body, and these two devices can be integrally formed or made separately and then fixedly positioned relative to each other on the upper end of the element in any suitable means. In the illustrated embodiment, the grappler head 42 is generally conical and includes a reduced neck portion 58 affording engagement thereby of a grappler device, in order to position the element in a reactor core and to withdraw it therefrom.

Although shown and described with respect to specific embodiments, it will be apparent that further modifications might be made without departing from the principles of this invention.

We claim:

1. In a fuel element for a neutronic reactor, the improvement comprising an interlocking means secured to said fuel element adjacent the upper end thereof and including portions projecting laterally away from the fuel element casing, said projecting portions alternately defining male and female elements adapted for lateral interlocking engagement with similar female elements and male elements, respectively, on adjacent fuel elements, whereby said fuel elements are positively interlocked against lateral displacement while any fuel element is longitudinally removable out of the reactor and the lateral stability of the adjoining fuel elements is undisturbed.

2. Interlocking means for fuel elements arranged in a pattern within the core of a neutronic reactor, comprising means secured to each fuel element adjacent the upper end thereof and including portions projecting outwardly from the sides of the fuel element casing, said projecting portions defining male and female elements, and said fuel elements and the interlocking means thereon being disposed so that each of said male elements engages a cooperating pair of said female elements on two adjoining fuel elements to thereby link the three engaged fuel elements together in a manner providing mutual support for said elements against lateral displacement, while each fuel element is longitudinally removable from the reactor core.

3. A fuel element for a nuclear reactor comprising an elongated cylindrical outer casing and a fuel element disposed within said casing, an interlocking means fixed to said casing adjacent the upper end thereof and comprising a main body section having portions projecting outwardly therefrom in laterally extending relation to the outer wall of said casing, said projecting portions being spaced-apart peripherally of said main body and defining male and female elements, at least one of said projecting portions being tapered downwardly and inwardly toward said main body, whereby said projecting portions are adapted for lateral interlocking engagement with complementary, similar portions on surrounding fuel elements in coextensive side by side arrangement within a reactor to position the fuel elements in a patterned arrangement and provide mutual lateral support for the fuel elements, and wherein each fuel element is longitudinally removable from the reactor.

4. A fuel element for a nuclear reactor comprising an elongated cylindrical outer casing and a fuel element disposed within said casing, an interlocking means fixed to said casing adjacent the upper end thereof and comprising a main body section having portions projecting outwardly therefrom in laterally extending relation to the outer wall of said casing, said projecting portions being spaced-apart peripherally of said main body and defining symmetrically arranged male and female locking elements, said male elements being tapered downwardly and inwardly toward said main body, and each of said female locking elements being adapted for cooperation with a similar female element on an adjacent fuel element interlocking means to thereby provide means for receiving a male element in interlocked engagement therewith, whereby said projecting portions afford positioing of fuel elements in a patterned arrangement within a reactor with said interlocking means providing mutual lateral support for said fuel elements in spaced relation to one another, and whereby each fuel element is longitudinally removable from the nuclear reactor.

5. A fuel element for a nuclear reactor comprising an elongated outer casing which is polygonal in cross section, an interlocking means fixed to said casing adjacent the upper end thereof and comprising a main body section having portions projecting outwardly therefrom in laterally extending relation to the outer walls of said casing, said projecting portions being spaced-apart peripherally of said main body and defining symmetrically arranged male and female locking elements, with each of said locking elements disposed adjacent the intersection of a pair of side wall surfaces on said casing, each of said casing side wall surfaces including means defining an elongated, projecting rib disposed intermediate the edges of said side wall, said male locking elements each including a lower portion which is tapered downwardly and inwardly toward said main body, and each of said female locking elements being adapted for cooperation with a similar female element on an adjacent fuel element interlocking means to thereby provide means for receiving a male element in interlocked engagement therewith, so that said projecting locking elements and ribs afford positioning of a plurality of fuel elements in a patterned arrangement within a reactor with said interlocking means providing mutual lateral support for the upper ends of said fuel elements and with each of said ribs disposed in proximate relation to a rib on the adjacent fuel element.

References Cited in the file of this patent
UNITED STATES PATENTS

| | | |
|---|---|---|
| 2,780,596 | Anderson | Feb. 5, 1957 |
| 2,872,398 | Ashley et al. | Feb. 3, 1959 |
| 2,885,335 | Moore et al. | May 5, 1959 |
| 2,902,422 | Hutter | Sept. 1, 1959 |
| 3,014,853 | Sheehan | Dec. 26, 1961 |